(12) United States Patent
Posudievsky et al.

(10) Patent No.: US 8,148,455 B2
(45) Date of Patent: Apr. 3, 2012

(54) HYBRID TWO- AND THREE-COMPONENT HOST-GUEST NANOCOMPOSITES AND METHOD FOR MANUFACTURING THE SAME

(75) Inventors: Oleg Yuliyovych Posudievsky, Kiev (UA); Olga Andriyvna Goncharuk, Kiev (UA); Vyacheslav Stepanovych Dyadyun, Kiev (UA); Vyacheslav Grygorovych Koshechko, Ukraine (UA); Scott W. Jorgensen, Bloomfield Township, MI (US); Vitaly Dmytrovych Pokhodenko, Kiev (UA)

(73) Assignee: GM Global Technology Operations LLC, Detroit, MI (US)

( * ) Notice: Subject to any disclaimer, the term of this patent is extended or adjusted under 35 U.S.C. 154(b) by 144 days.

(21) Appl. No.: 12/623,000

(22) Filed: Nov. 20, 2009

(65) Prior Publication Data

US 2011/0121225 A1      May 26, 2011

(51) Int. Cl.
    *C08K 3/22* (2006.01)
(52) U.S. Cl. .................. 524/408; 524/431
(58) Field of Classification Search .......... 524/408, 524/431
    See application file for complete search history.

(56) References Cited

U.S. PATENT DOCUMENTS

| | | | |
|---|---|---|---|
| 5,368,957 A | 11/1994 | Kozmik et al. | |
| 6,582,850 B2 * | 6/2003 | Park et al. | 429/213 |
| 7,819,962 B2 * | 10/2010 | Gu | 106/31.6 |
| 7,899,552 B2 | 3/2011 | Atanasoska et al. | |
| 2009/0272949 A1 * | 11/2009 | Buttry | 252/519.34 |

FOREIGN PATENT DOCUMENTS

UA            16318 U       8/2006

OTHER PUBLICATIONS

Goward, G.R. et al, "Poly(pyrrole) and poly(thiophene)/vanadium oxide interleaved nanocomposites: positive electrodes for lithium batteries," Electrochimica Acta., vol. 43, Nos. 10-11, pp. 1307-1313, 1998.
Huguenin, F. et al, "Lithium Electroinsertion into an Inorganic-Organic Hybrid Material Composed from V2O5 and Polyaniline," J. Electrochem. Soc., 149 (5), A546-A553, 2002.
Leroux, F. et al., "Electrochemical Li Insertion into Conductive Polymer/V2O5 Nanocomposites," J. Electrochem. Soc., vol. 144, No. 11, Nov. 1997, pp. 3886-3895.
Lira-Cantu, M. et al., "The Organic-Inorganic Polyaniline/V2O5 System Application as a High-Capacity Hybrid Cathode for Rechargeable Lithium Batteries," J. Electrochem. Soc., vol. 146, No. 6, pp. 2029-2033, 1999.
Murugan, A.V. et al, "Synthesis and characterization of a new organo-inorganic poly(3,4-ethylene dioxythiophene) PEDOT/V2O5 nanocomposite by intercalation," J. Mater. Chem., vol. 11, pp. 247-2475, 2001.

* cited by examiner

*Primary Examiner* — Peter Szekely
(74) *Attorney, Agent, or Firm* — Brooks Kushman P.C.

(57) ABSTRACT

A hybrid organic-inorganic nanocomposite useful as a cathode in high discharge capacity lithium batteries is provided. The nanocomposite includes macromolecules that are located inside interlayer galleries of $V_2O_5$. These macromolecules include either conducting conjugated polymers or a combination of conducting conjugated polymers and ion conducting polymers. The nanocomposites possess high charge/discharge characteristics. A solvent-free mechanochemical method for the preparation of the hybrid organic-inorganic nanocomposites is also provided.

21 Claims, 6 Drawing Sheets

HYBRID TWO- AND THREE-COMPONENT HOST-GUEST NANOCOMPOSITES AND METHOD FOR MANUFACTURING THE SAME

TECHNICAL FIELD

The present invention relates to hybrid organic-inorganic nanocomposites that are useful as an active component of a lithium battery cathode and to methods for manufacturing the nanocomposites.

BACKGROUND

Lithium batteries are energy storage and production devices capable of being charged and discharged. Such batteries are widely used as autonomous power sources for various portable electronic devices (e.g., cellular phones, cameras, audio players, laptop computers, and the like). The development of batteries that are lightweight and have higher charge/discharge capacity is an important issue for autonomous energetics.

A typical lithium battery includes a cathode, an electrolyte and an anode. The charge/discharge characteristics of cathode materials are important factors in determining the capacity for energy storage. Crystalline oxides based on cobalt, manganese, nickel and vanadium are the most studied materials for the cathode materials in lithium batteries. Commercialized $LiCoO_2$ has high redox potential along with long term stability. However, such materials tend to be costly and toxic while also having a low charge/discharge capacity. $LiMn_2O_4$ has been considered as an alternative to conventional $LiCoO_2$ because of its sufficiently high redox potential and associated low cost. However, this material also suffers from a low charge/discharge capacity and long term stability at cycling. Although $LiNiO_2$ is another potential cathode material because of its theoretically better discharge capacity than $LiCoO_2$, this material presents significant difficulty with respect to its preparation. For the case of $V_2O_5$, there is a disadvantage with respect to the stability of the material at charge/discharge cycling. Therefore, there is an urgent demand in creation of a new electrode material to overcome the shortcomings of the known crystalline transition metal oxides.

Recent trends in the field of portable electrical devices have focused on reducing power consumption, which requires creation of a current source with a relatively low working voltage and a high energy density. To meet this end, a battery with high charge/discharge capacity is required.

Improved discharge capacity for electrochemical lithium insertion has been observed for the two-component hybrid host-guest nanocomposites based on vanadium oxide ($V_2O_5$) and conducting polymers (CPs): nanocomposites of $V_2O_5$ with intercalated polyaniline (PAn), which were disclosed by Nazar et al. [E. Leroux, G. Goward, W. P. Power and L. F. Nazar, "Electrochemical Li Insertion into Conductive Polymer/$V_2O_5$ Nanocomposites", Journal of Materials Chemistry, 1995, vol. 5, p. 1985], Gómez-Romero et al. [M. Lira-Cantú and P. Gómez-Romero, "The Organic-Inorganic Polyaniline/$V_2O_5$ System. Application as a High-Capacity Hybrid Cathode for Rechargeable Lithium Batteries", Journal of the Electrochemical Society, 1999, vol. 146, p. 2029], Buttry et al. [F. Huguenin, R. M. Torresi and D. A. Buttry, Journal of the Electrochemical Society, 2002, vol. 149, p.A546]; nanocomposites of $V_2O_5$ with intercalated polypyrrole (PPy) and polythiophene (PTh), which were disclosed by Nazar et al. [G. Goward, E. Leroux, and L. F. Nazar, "Poly (pyrrole) and Poly(thiophene)/Vanadium Oxide nanocomposites: Positive Electrodes for Lithium Batteries", Electrochimica Acta, 1998, vol. 43, p. 1307]; nanocomposites of $V_2O_5$ with intercalated poly(3,4-ethylene dioxythiophene), which were disclosed by Murugan et al. [A. V. Murugan, B. B. Kale, C.-W. Kwon, G. Campet and K. Vijayamohanan, "Synthesis and characterization of a new organo-inorganic poly(3,4-ethylene dioxythiophene) PEDOT/$V_2O_5$ nanocomposite by intercalation", Journal of Materials Chemistry, 2001, vol. 11, p. 2470]. Also, improved discharge capacity for electrochemical lithium insertion and charge/discharge cycling ability, as compared with two-component nanocomposites, are observed for $V_2O_5$-based three-component hybrid host-guest nanocomposites: poly(2,5-dimercapto-1,3,4-thiadiazole)-PAn-$V_2O_5$ nanocomposites, disclosed by Park et al. [U.S. Pat. No. 6,582,850]; PAn-polyethylene oxide (PEO)-$V_2O_5$, disclosed by Pokhodenko et al. [UA Pat. No. 16318].

Accordingly, there is a need for improved methodology for forming cathode materials for lithium battery applications.

SUMMARY OF EXEMPLARY EMBODIMENTS OF THE INVENTION

The present invention solves one or more problems of the prior art by providing in one embodiment a hybrid host-guest nanocomposite that is useful as a cathode in high discharge capacity lithium batteries. The nanocomposite of this embodiment includes $V_2O_5$ and conductive polymer or combinations of conductive polymers.

In another embodiment, a method for forming a hybrid two-component host-guest nanocomposite comprising a conducting conjugated polymer and vanadium oxide is provided. The method of this embodiment comprises combining a $V_2O_5$ xerogel and a monomer of one or more of conducting conjugated polymers to form a reaction mixture. The reaction mixture is then mechanically agitated to form the hybrid nanocomposite. This latter step is a mechanochemical treatment step. Advantageously, the mechanochemical treatment step is solvent-free.

In still another embodiment of the present invention, a method for forming a hybrid three-component host-guest nanocomposite comprising a conducting conjugated polymer, an ion conducting polymer, and vanadium oxide is provided. The method of this embodiment comprises combining a $V_2O_5$ xerogel and an ion conductive polymer to form a first reaction mixture. The first reaction mixture is then mechanically agitated to form a first hybrid nanocomposite. The first hybrid nanocomposite and a monomer of one or more of conductive polymers are then combined to form a second reaction mixture. The second reaction mixture is then mechanically agitated to form the hybrid three-component nanocomposite.

The two-component and three-component host-guest nanocomposites are advantageously prepared by effective and environmentally friendly methods. Moreover, these host-guest nanocomposites possess improved charge/discharge performance in comparison with the known prior art analogues. Accordingly, these nanocomposites can be used for creation of high discharge capacity-required lithium batteries.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventor. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of component.

Figure 1:
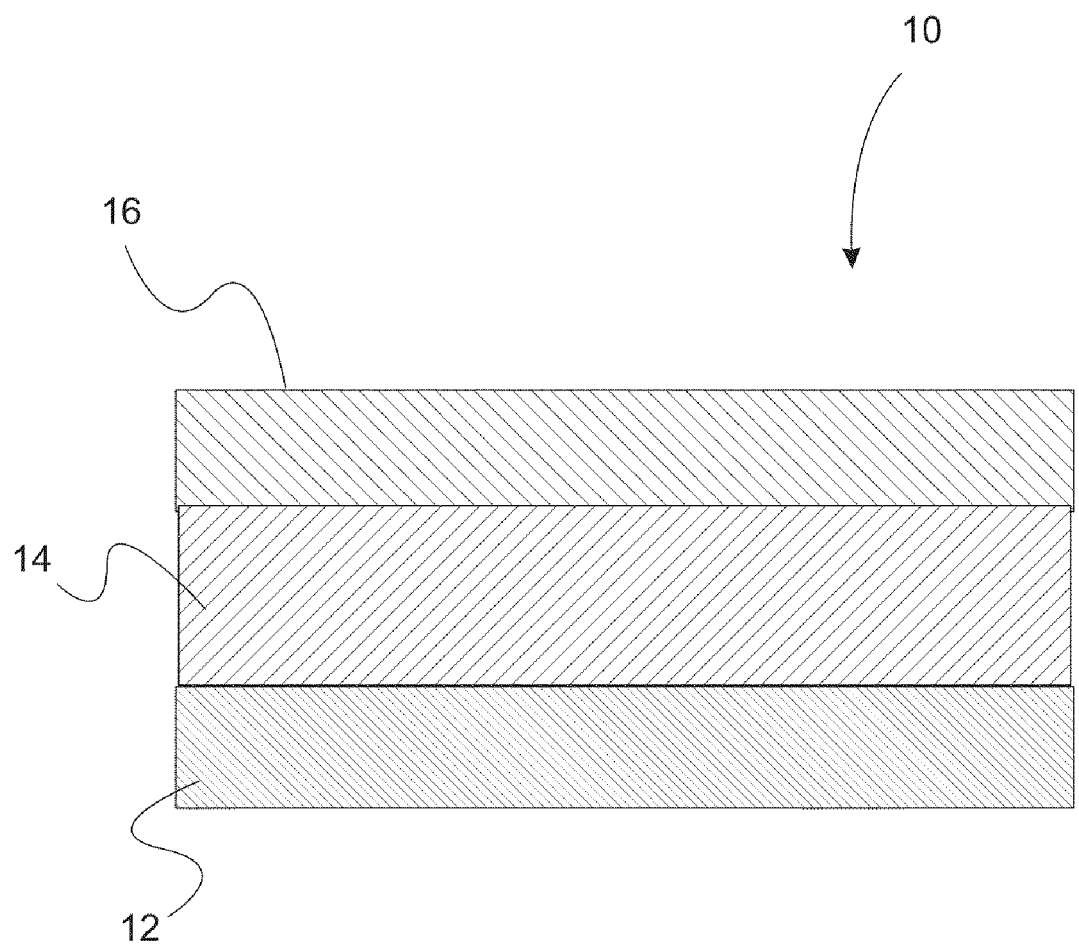
FIG. 1 is a schematic cross section of a lithium battery using a hybrid organic-inorganic nanocomposite FIG. 2 provides FTIR spectra of $V_2O_5$ xerogel and PAn-$V_2O_5$, PPy-$V_2O_5$, PTh-$V_2O_5$, PEO-$V_2O_5$, PAn-PEO-$V_2O_5$, PPy-PEO-$V_2O_5$, PTh-PEO-$V_2O_5$ nanocomposites; where (a): xerogel $V_2O_5$, (b): $PAn_{0.1}V_2O_5$, (c): $PPy_{0.1}V_2O_5$, (d): $PTh_{0.1}V_2O_5$, (e): $PEO_{0.25}V_2O_5$, (f): $PAn_{0.12}PEO_{0.22}V_2O_5$, (g): $PPy_{0.1}PEO_{0.25}V_2O_5$, (h): $PTh_{0.1}PEO_{0.25}V_2O_5$.

With reference to FIG. 1, a schematic cross section of a lithium battery using a hybrid organic-inorganic nanocomposite is provided. Lithium battery 10 includes anode layer 12, electrolyte layer 14, and cathode layer 16. Advantageously, cathode layer 16 includes the hybrid organic-inorganic nanocomposites set forth below in more detail. For example, a composite of polyaniline or polypyrrole with vanadium oxide.

In an embodiment of the present invention, a hybrid organic-inorganic nanocomposites that is useful as a battery cathode material is provided. The nanocomposite of this embodiment includes $V_2O_5$ and a conductive polymer. In one variation, the nanocomposite is a two-component hybrid organic-inorganic nanocomposite. In another variation, the nanocomposite is a three-component hybrid organic-inorganic nanocomposite. The composites of the present embodiments consist of alternating layers with thicknesses in the angstrom to nanometer range.

In a refinement of the present embodiment, the conductive polymer is an electrically conducting conjugated polymer ("CCP"). Examples of suitable conducting conjugated polymers include, but are not limited to, polyaniline ("PAn"), polypyrrole ("PPy"), polythiophene ("PTh"), and combinations thereof, and derivatives thereof. Examples of suitable derivatives of these polymers include, but are not limited to, acid salts when the polymers include a basic group (e.g., acid chlorides of amines) and compounds formed by replacing a hydrogen atom with a halogen, an alkyl group (e.g., $C_1$-$C_{10}$ alkyl), an hydroxyl, an ester group, an alkoxy group, an aryl group, etc., and combinations thereof. In another refinement, the nanocomposite includes an ion conducting polymer. A non-limiting example of an ion conducting polymer is polyethylene oxide ("PEO") and derivatives thereof. Examples of suitable derivatives of the PEO include, but are not limited to, acid salts when the polymers include a basic group (e.g., acid chlorides of amines) and compounds formed by replacing a hydrogen atom with a halogen, an alkyl group (e.g., $C_1$-$C_{10}$ alkyl), an hydroxyl, an ester group, an alkoxy group, an aryl group, etc., and combinations thereof. In still another refinement, the nanocomposite includes a conducting conjugated polymer and an ion conducting polymer.

In another embodiment of the present invention, a method of forming the nanocomposite set forth above is provided. The method of this embodiment includes a step of forming a reaction mixture comprising a vanadium oxide (e.g., $V_2O_5$) xerogel and a monomer of one or more of the polymers set forth above (i.e., CCP and/or PEO). The term "xerogel" as used herein refers to a solid formed by the removal of solvent or water of a gel. The reaction mixture is subsequently subjected to a mechanochemical treatment in which the reaction mixture is mechanically agitated. In a refinement, a predetermined amount of milling media is added to the reaction mixture prior to mechanochemical treatment.

In an embodiment in which a two component nanocomposite is formed, a $V_2O_5$ xerogel and a monomer of one or more of conducting conjugated polymers are combined to form a reaction mixture. Examples of useful monomers include, but are not limited to, aniline, pyrrole, thiophene, and derivatives thereof, and combinations thereof. Examples of suitable derivatives of the monomers include, but are not limited to, acid salts when the monomers include a basic group (e.g., acid chlorides of amines) and compounds formed by replacing a hydrogen atom with a halogen, an alkyl group (e.g., $C_1$-$C_{10}$ alkyl), an hydroxyl, an ester group, an alkoxy group, an aryl group, etc., and combinations thereof. The reaction mixture is then mechanically agitated in the mechanochemical treatment step to form the hybrid nanocomposite. In a refinement, the mechanoreatment treatment step is solvent-free. In one variation, the $V_2O_5$ xerogel is present in an amount from about 83 to about 97 weight percent of the total weight of the total weight of the reaction mixture. In another variation, one or more of conducting conjugated polymers are present in an amount from about 3 to about 17 weight percent of the total weight of the total weight of the reaction mixture.

In an embodiment in which a three-component nanocomposite is formed, a $V_2O_5$ xerogel and an ion conductive polymer are combined to form a first reaction mixture. In one variation, the $V_2O_5$ xerogel is present in an amount from about 94 to about 98 weight percent of the total weight of the total weight of the first reaction mixture. In another variation, the ion conducting polymer is present in an amount from about 2 to about 6 weight percent of the total weight of the total weight of the reaction mixture. The first reaction mixture is then mechanically agitated in a mechanochemical treatment step to form a first hybrid nanocomposite. The first hybrid nanocomposite and a monomer of one or more of conductive polymers are then combined to form a second reaction mixture. The second reaction mixture is then mechanically agitated in a second mechanochemical treatment step to form the hybrid three-component nanocomposite. In a variation of this embodiment, the first hybrid nanocomposite is present in an about from about 86 to about 97 weight percent of the total weight second reaction mixture. In another variation, the one or more of conducting conjugated polymers are present in an amount from about 3 to about 14 weight percent of the total weight of the total weight of the second reaction mixture. In another variation of this embodiment one or more of the following conditions are present, the ion conducting polymer is present in an amount from about 2 to 6 percent of the total weight of the hybrid nanocomposite, the vanadium oxide is present in an amount from about 80 to 95 percent of the total weight of the hybrid nanocomposite, and the conducting conjugated polymer is present in an amount from about 3 to 14 percent of the total weight of the hybrid nanocomposite.

The $V_2O_5$ xerogel has a layered structure that is prepared by evaporation of an aqueous $V_2O_5$-containing sol. A number of techniques for preparing the $V_2O_5$-containing sol are known in the prior art. For example, the $V_2O_5$-containing sol may be prepared by reaction of crystalline $V_2O_5$ with hydrogen peroxide, or by interaction of melted $V_2O_5$ with water. Specifically, crystalline $V_2O_5$ is dissolved in aqueous hydrogen peroxide solution and then aged in air (typically about 2 week) at an elevated temperature (100° C. is suitable). The solvent is subsequently evaporated. The aged solution is then dried at an elevated temperature (e.g., about 120° C.) until a distance between $V_2O_5$ layers in the xerogel is from about 1.14 to about 1.19 nm. In a refinement, the distance between $V_2O_5$ layers in the xerogel is from about 1.15 to about 1.16 nm.

The reaction mixture, preferably with milling media therein, is subjected to mechanochemical treatment to promote intercalative polymerization in the case of the monomer of the corresponding CCP or intercalation of PEO macromolecules inside interlayer space of $V_2O_5$ xerogel. In a variation, the mechanochemical treatment is carried out under ambient conditions. In a refinement, the mechanochemical treatment is carried out at a temperature between 15° C. and 40° C. During mechanochemical treatment, a hybrid nanocomposite, organic macromolecules of which are located inside interlayer space of $V_2O_5$ xerogel, is formed.

The term "mechanochemical treatment" as used herein means a process in which mechanical energy is used to activate, initiate or promote a chemical reaction, a crystal structure transformation or a phase change in a material or a mixture of materials. Examples of mechanochemical treatment process include, but are not limited to, "mechanochemical synthesis", "mechanochemical activation", "reactive milling", and related processes. In one variation, mechanochemical treatment includes a step in which a reaction mixture is agitated in the presence of a milling media to transfer mechanical energy to the reaction mixture. The reaction mixture can be contained in a closed vessel or chamber. The term "agitating" or "agitation" as used herein shall include applying at least one, or any combination of two or more of the fundamental kinematic motions including translation (e.g., side-to-side shaking), rotation (e.g., spinning or rotating) and inversion (e.g., end-over-end tumbling) to the reaction mixture. In a useful variation, all three motions are applied to the reaction mixture. It should be appreciated that such agitation can be accomplished with or without external stirring of the reaction mixture and milling media.

In a variation of the mechanochemical treatment step, a mixture of reactant powders or a mixture of reactant powder and liquid organic compound is combined in suitable proportions with milling media in a vessel or chamber that is mechanically agitated (i.e., with or without stirring) for a predetermined period of time at a predetermined intensity of agitation. In another variation of the mechanochemical treatment step, the reaction mixture is mechanically agitated (i.e., with or without stirring) for a predetermined period of time at a predetermined intensity of agitation under nominally ambient conditions in the absence of added liquids or organic solvents.

In still another variation of the method of forming the nanocomposites, a predetermined amount of milling media, preferably chemically-inert, rigid milling media, is added to a dry reaction mixture comprising xerogel $V_2O_5$ and organic component, which is a monomer of the corresponding CCP, or PEO herein, prior to mechanochemical treatment. Typically, the weight ratio of reaction mixture to milling media can range from about 1:3 to 1:40. The reaction mixture is subjected to mechanochemical treatment, for example, in a milling apparatus whereby the reaction mixture is agitated in the presence of milling media at ambient temperature (i.e., without the need for external heating). The term "chemically-inert" milling media as used herein means that the milling medium does not react chemically with any of the components of the reaction mixture. The rigid milling media advantageously comprises various materials such as natural minerals, ceramics, glass, metal or high-strength polymeric compositions, in a particulate form. Preferred ceramic materials, for example, can be selected from a wide array of ceramics desirably having sufficient hardness and friability to enable them to avoid being chipped or crushed during milling and also having sufficiently high density. Suitable densities for milling media are from about 3 to 15 g/cm³. Examples of ceramic materials include, but are not limited to, agate, aluminum oxide, zirconium oxide, zirconia-silica, yttria-stabilized zirconium oxide, magnesia-stabilized zirconium oxide, silicon nitride, silicon carbide, cobalt-stabilized tungsten carbide and the like, and combinations thereof. In a refinement, the glass milling media are spherical (e.g., beads), have a narrow size distribution, and are durable. Suitable metal milling media are typically spherical and generally have good hardness (i.e., Rockwell hardness RHC 60-70), extreme roundness, high wear resistance, and narrow size distribution. Metal milling media include, for example, balls fabricated from type 52100 chrome steel, type 316 or 440C stainless steel or type 1065 high carbon steel.

In a variation of the present embodiment, the mechanochemical treatment is accomplished by a milling apparatus that applies compressive forces and shear stress to the particles of the reaction mixture over a prolonged time. A suitable apparatus for accomplishment of the mechanochemical treatment of the present invention is a planetary ball mill, for example Pulverizette 6 available commercially from Fritsch.

Although the embodiments of the present invention are not limited to any particular theory of operation, it is believed that during the mechanochemical treatment of the reaction mixture, the impact of the milling media with particles of xerogel $V_2O_5$ and monomers of the corresponding CCP can result in the oxidation and polymerization of the organic molecules. It is further theorized that because of the layered structure of the xerogel particles, CCP can be advantageously inserted into the interlayer galleries (i.e., spaces) of the inorganic particles because of ion-exchange of protons in the matrix of the xerogel $V_2O_5$ by organic cations and the shear stress induced by mechanochemical treatment. It is also appreciated that polymerization and intercalation can take place simultaneously.

It is also theorized that the mechanochemical activation of interaction between particles of xerogel $V_2O_5$ and PEO can result in the insertion of the polymer chains into the interlayer galleries of $V_2O_5$ because of their affinity to protons in the matrix of the xerogel $V_2O_5$ and the shear stress induced by mechanochemical treatment. Moreover, it is also believed that in conditions of mechanochemical treatment of the prepared composite PEO-$V_2O_5$ particles and monomer of the corresponding CCP of the present invention can result in the oxidation and polymerization of the organic molecules. It is also believed that CCP can be advantageously inserted into the interlayer galleries of the inorganic particles because of ion-exchange of protons in the matrix of the xerogel $V_2O_5$ by organic cations and the shear stress induced by mechanochemical treatment because of the layered structure of the xerogel particles. It is not excluded by the applicants that polymerization and intercalation can take place simultaneously.

Mechanochemical treatment of the mixture of the xerogel $V_2O_5$ or the composite PEO-$V_2O_5$ and monomer of the corresponding CCP for an inadequate period of time (e.g., less than about 60 minutes) can result in non-homogeneity of the reaction mixture, incomplete polymerization and/or intercalation of the organic component and exhibits poor discharge performance. Prolonged mechanochemical treatment (e.g., >24 hours) is also undesirable since the hybrid nanocomposite becomes highly amorphous and also exhibits poor discharge performance. Therefore, in a refinement of the present embodiment, the mechanochemical treatment of the mixture is between 1 hour and 24 hours in duration.

The following examples illustrate the various embodiments of the present invention. Those skilled in the art will recognize many variations that are within the spirit of the present invention and scope of the claims.

Example 1

Preparation of $V_2O_5$ Xerogel

A $V_2O_5$ xerogel is prepared by dissolving 15 g of crystalline $V_2O_5$ in 1.5 L of 10% hydrogen peroxide solution, which is aged for two weeks in air. Powder form of $V_2O_5$ is obtained by evaporation of the solution at the temperature of 100° C. and is dried at the temperature of 120° C., while the interlayer distance between the galleries of $V_2O_5$ becomes 1.14-1.19 nm, preferably 1.15-1.16 nm.

Example 2

Preparation of PAn-$V_2O_5$ Type Hybrid Nanocomposite

A two-component hybrid host-guest nanocomposite based on PAn and $V_2O_5$ is prepared by combining 3 g of xerogel $V_2O_5$ of Example 1 and 0.186 g of anilinium chloride preliminarily recrystallized in water with thirty 1 cm diameter spherical agate milling media in an 80 mL grinding jar. The weight ratio of reactants to milling media is about 1:14. The mixture is mechanochemically treated using a planetary ball mill Pulverizette 6 at an agitation speed of 300 rpm for a period of 8 hours. The product is separated from milling media by dry sieving and purified by 20-fold extraction with acetonitrile in a Soxlet apparatus. The nanocomposite $PAn_{0.11}V_2O_5$ is finally obtained.

Example 3

Preparation of PPy-$V_2O_5$ Type Hybrid Nanocomposite

A two-component hybrid host-guest nanocomposite based on PPy and $V_2O_5$ is prepared by combining 3 g of xerogel $V_2O_5$ of Example 1 and 0.098 mL of pyrrole preliminarily distilled in an atmosphere of argon with thirty 1 cm diameter spherical agate milling media in an 80 mL grinding jar. The weight ratio of reactants to milling media is about 1:14. The mixture is mechanochemically treated using a planetary ball mill Pulverizette 6 at an agitation speed of 300 rpm for a period of 8 hours. The product—$PPy_{0.1}V_2O_5$ nanocomposite—is separated from milling media by dry sieving.

Example 4

Preparation of PTh-$V_2O_5$ Type Hybrid Nanocomposite

A two-component hybrid host-guest nanocomposite based on PTh and $V_2O_5$ is prepared by combining 3 g of xerogel $V_2O_5$ of Example 1 and 0.118 g of bithiophene preliminarily recrystallized in ethanol with thirty 1 cm diameter spherical agate milling media in an 80 mL grinding jar. The weight ratio of reactants to milling media is about 1:14. The mixture is mechanochemically treated using a planetary ball mill Pulverizette 6 at an agitation speed of 300 rpm for a period of 8 hours. The product—$PTh_{0.1}V_2O_5$ nanocomposite—is separated from milling media by dry sieving.

Example 5

Preparation of PEO-$V_2O_5$ Type Hybrid Nanocomposite

A two-component hybrid host-guest nanocomposite based on PEO and $V_2O_5$ is prepared by combining 6 g of xerogel $V_2O_5$ of Example 1 and 0.316 g of PEO (molecular weight $6·10^5$, Aldrich) with thirty 1 cm diameter spherical agate milling media in an 80 mL grinding jar. The weight ratio of reactants to milling media is about 1:7. The mixture is mechanochemically treated using a planetary ball mill Pulverizette 6 at an agitation speed of 300 rpm for a period of 8 hours. The product—$PEO_{0.25}V_2O_5$ nanocomposite—is separated from milling media by dry sieving.

Example 6

Preparation of PAn-PEO-$V_2O_5$ Type Hybrid Nanocomposite

A three-component hybrid host-guest nanocomposite based on PAn, PEO and $V_2O_5$ is prepared by combining 3 g of $PEO_{0.25}V_2O_5$ nanocomposite of Example 5 and 0.302 g of anilinium chloride preliminarily recrystallized in water with thirty 1 cm diameter spherical agate milling media in an 80 mL grinding jar. The weight ratio of reactants to milling media is about 1:13. The mixture is mechanochemically treated using a planetary ball mill Pulverizette 6 at an agitation speed of 300 rpm for a period of 8 hours. The product is separated from milling media by dry sieving and purified by 20-fold extraction with acetonitrile in a Soxlet apparatus. The nanocomposite $PAn_{0.12}PEO_{0.22}V_2O_5$ is finally obtained.

Example 7

Preparation of $PPy$-$PEO$-$V_2O_5$ Type Hybrid Nanocomposite

A three-component hybrid host-guest nanocomposite based on PPy, PEO and $V_2O_5$ is prepared by combining 3 g of $PEO_{0.25}V_2O_5$ nanocomposite of Example 5 and 0.102 mL of pyrrole preliminarily distilled in an atmosphere of argon with thirty 1 cm diameter spherical agate milling media in an 80 mL grinding jar. The weight ratio of reactants to milling media is about 1:14. The mixture is mechanochemically treated using a planetary ball mill Pulverizette 6 at an agitation speed of 300 rpm for a period of 8 hours. The product—$PPy_{0.1}PEO_{0.25}V_2O_5$ nanocomposite—is separated from milling media by dry sieving.

Example 8

Preparation of $PTh$-$PEO$-$V_2O_5$ Type Hybrid Nanocomposite

A three-component hybrid host-guest nanocomposite based on PAn, PEO and $V_2O_5$ is prepared by combining 3 g of $PEO_{0.25}V_2O_5$ nanocomposite of Example 5 and 0.127 g of bithiophene preliminarily recrystallized in ethanol with thirty 1 cm diameter spherical agate milling media in an 80 mL grinding jar. The weight ratio of reactants to milling media is about 1:14. The mixture is mechanochemically treated using a planetary ball mill Pulverizette 6 at an agitation speed of 300 rpm for a period of 8 hours. The product—$PTh_{0.1}PEO_{0.25}V_2O_5$ nanocomposite—is separated from milling media by dry sieving.

FTIR Measurements

Figure 2:
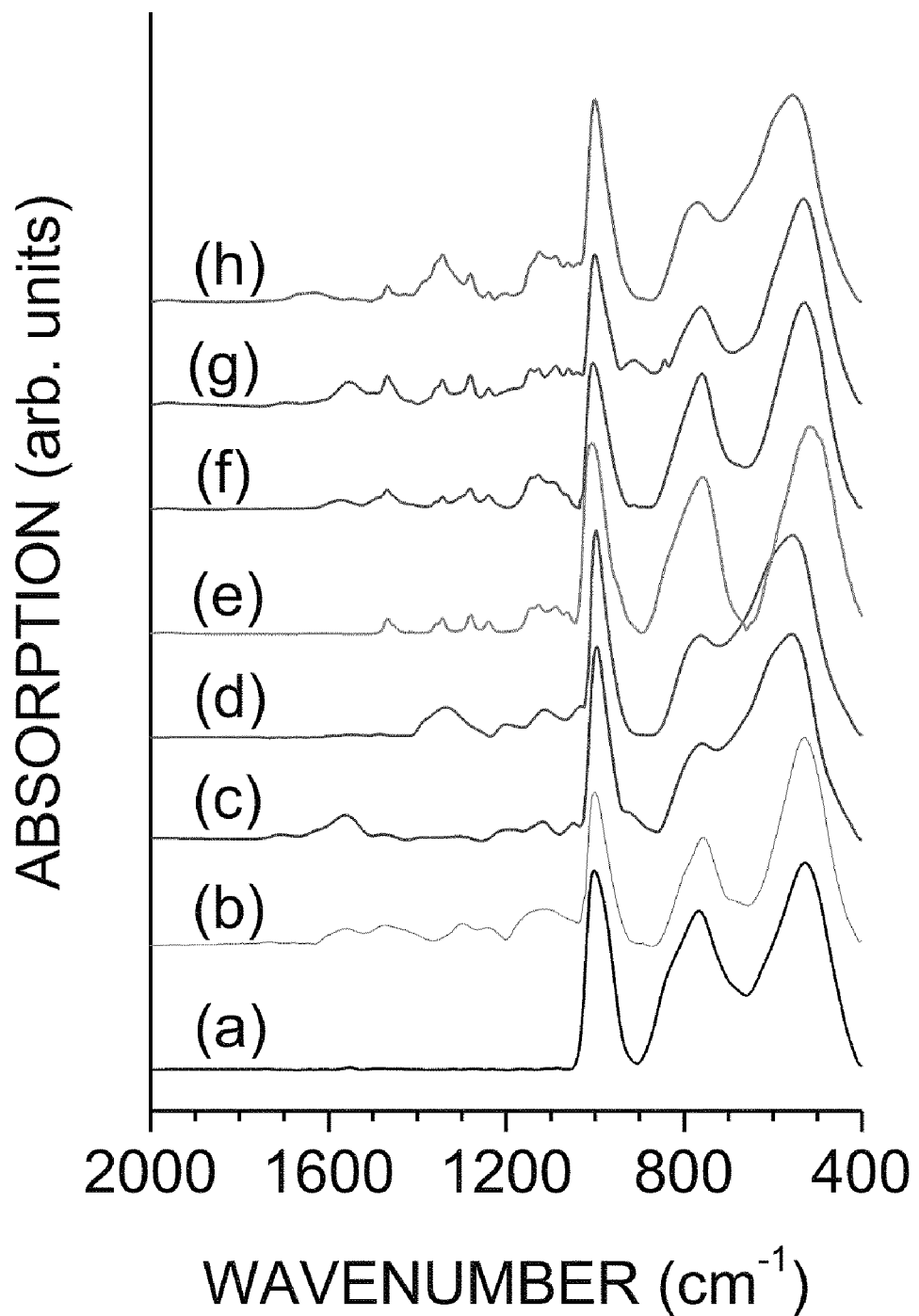

FIG. 2 provides Fourier transformed infrared spectra of the compounds that are prepared as set forth above. Spectrum (a) is for the dried $V_2O_5$ xerogel, spectrum (b) is for PAn-$V_2O_5$ prepared in Example 2, spectrum (c) is for PPy-$V_2O_5$ prepared in Example 3, spectrum (d) is for PTh-$V_2O_5$ prepared in Example 4, spectrum (e) is for PEO-$V_2O_5$ prepared in Example 5, spectrum (f) is for PAn-PEO-$V_2O_5$ prepared in Example 6, spectrum (g) is for PPy-PEO-$V_2O_5$ prepared in Example 7, spectrum (h) is for PTh-PEO-$V_2O_5$ prepared in Example 8.

Three bands lower than 1000 $cm^{-1}$ in spectrum (a) correspond to the typical vibrations of bonds between V and O. The bands about 1115, 1244, 1301, 1472 and 1558 $cm^{-1}$ in spectrum (b) are characteristic of PAn. The bands about 794, 932, 1053, 1213, 1296, 1480 and 1563 $cm^{-1}$ in spectrum (c) are characteristic of PPy. The bands about 690, 786, 1034, 1115, 1205 and 1334 $cm^{-1}$ in spectrum (d) are characteristic of PTh. The bands about 1456, 1343, 1280, 1099 $cm^{-1}$ in spectrum (e) are characteristic of PEO. The spectrum (f) clearly shows PAn and PEO co-existed inside the $V_2O_5$ layers. Spectrum (g) clearly shows PPy and PEO co-existed inside the $V_2O_5$ layers. Spectrum (h) clearly shows PTh and PEO co-existed inside the $V_2O_5$ layers.

X-Ray Diffraction (XRD) Measurements

Figure 3:
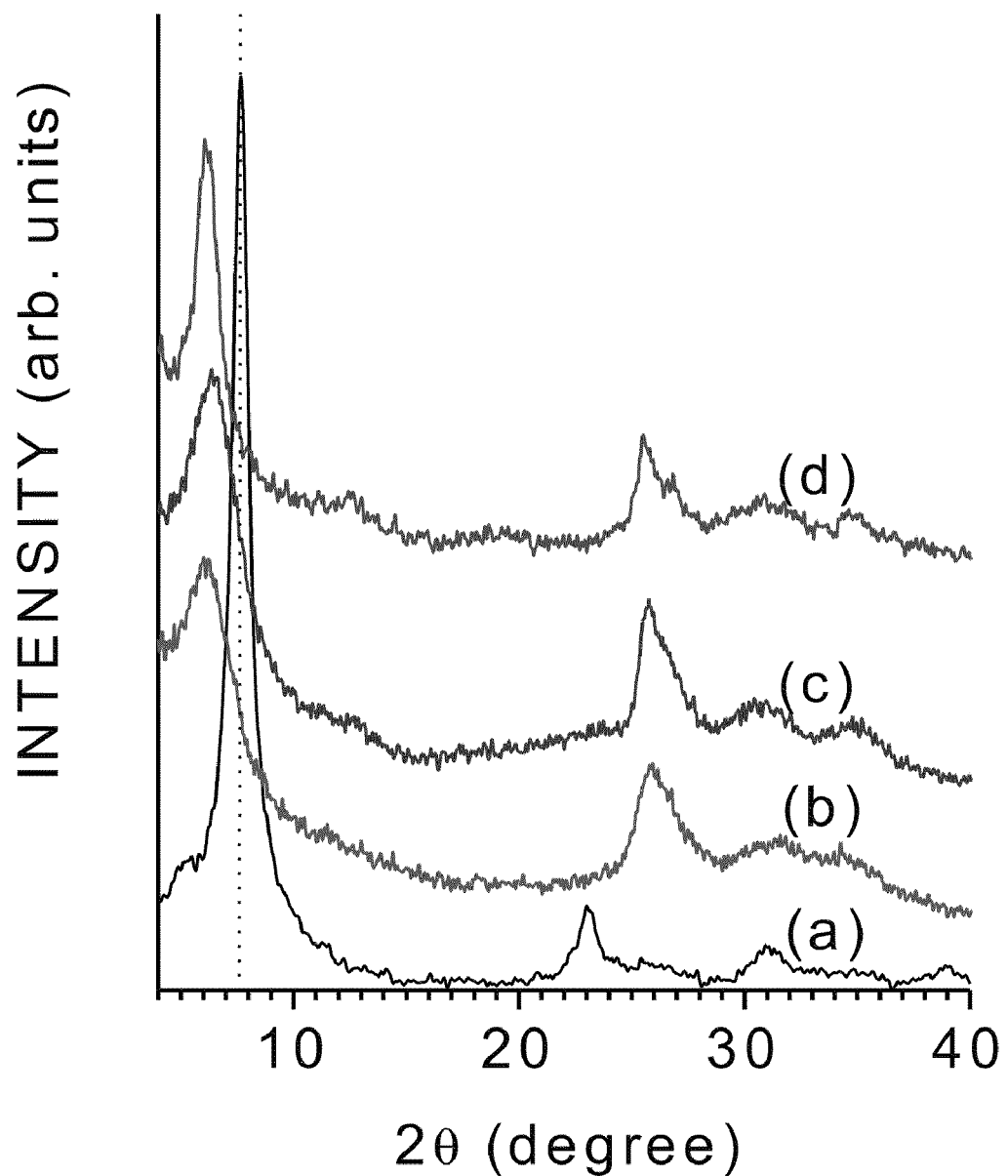
FIG. 3 provides X-ray diffraction patterns of $V_2O_5$ xerogel and PTh-$V_2O_5$, PEO-$V_2O_5$, PTh-PEO-$V_2O_5$ nanocomposites; where (a): xerogel $V_2O_5$, (b): PTh-$V_2O_5$, (c): PEO-$V_2O_5$, (d): PTh-PEO-$V_2O_5$.

FIG. 3 provides XRD patterns for the materials prepared as described above. The compounds corresponding to FIG. 3 are identical to those corresponding to FIG. 2. XRD analysis confirms the intercalation of organic polymers inside the interlayer galleries of $V_2O_5$ xerogel from the lower angle-shifted (001) reflections upon intercalation. Lattice expansion from 1.16 nm to 1.42 nm is typically observed for the two-component CCP-intercalated samples, to 1.38 nm—typical for the two-component PEO-intercalated samples, to 1.46 nm—typical for the three-component samples intercalated with CCP and PEO. The interlayer expansion in 0.26-0.30 nm is a consequence of insertion of CCP and/or PEO and removal of one monolayer of water molecules (about 0.28 nm). Therefore, the height of the interlayer galleries can be 0.54-0.58 nm, for three-component hybrid nanocomposites typically being 0.05 nm greater than for two-component nanocomposites.

Discharge Characteristics of as-Prepared Samples

A Swagelok™-type cell is assembled in the dry glove box for electrochemical measurements. The mixture of the synthesized hybrid organic-inorganic material, carbon black and the poly[(vinylidene fluoride)-co-hexafluoropropylene] (75: 15:10 wt. %) is used as a cathode, Li foil as a negative electrode and 1M solution of $LiClO_4$ in ethylene carbonate/dimethyl carbonate (50:50 vol. %) as an electrolyte.

Figure 4:
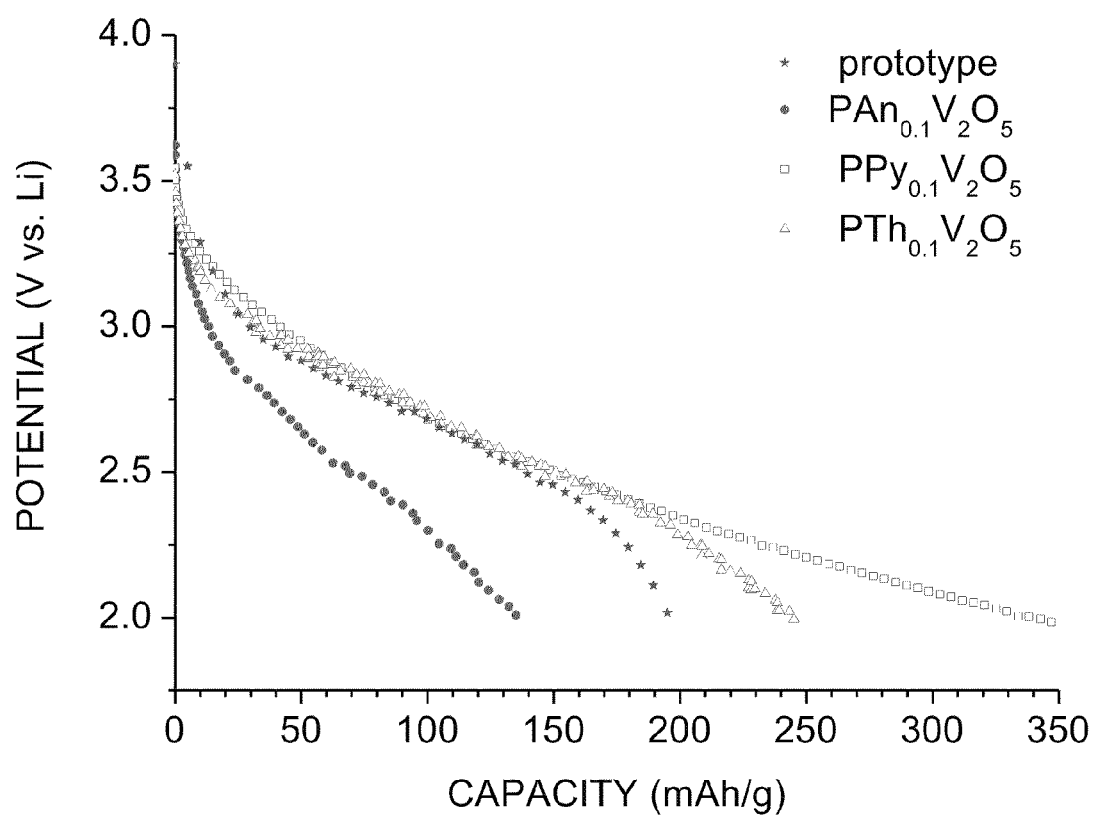
FIG. 4 compares the first discharge capacity of the as-prepared two-component nanocomposites $PAn_{0.1}V_2O_5$, $PPy_{0.1}PEO_{0.25}V_2O_5$, $PTh_{0.1}V_2O_5$ measured at current density 15 mA/g in the 2.0-4.0 V potential range with that of the cathode material disclosed in U.S. Pat. No. 6,582,850.

FIG. 4 provides a comparison of first discharge curves measured at the current density of 15 mA/g in the range of 2.0-4.0V for the as-prepared two-component nanocomposites $PAn_{0.11}V_2O_5$, $PPy_{0.1}V_2O_5$ Ta $PTh_{0.1}V_2O_5$ with that of the cathode material set forth in U.S. Pat. No. 6,582,850. For the as-prepared three-component hybrid organic-inorganic nanocomposites the same tendency is observed.

Comparison of Cycling Ability

Figure 5:
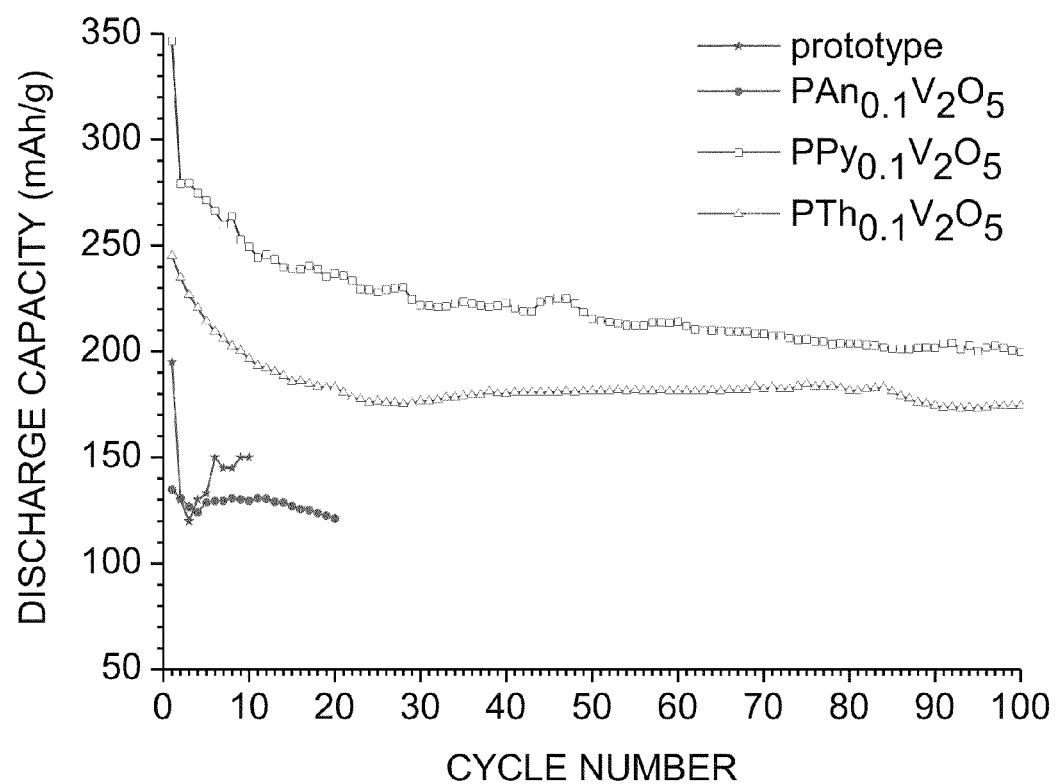
FIG. 5 shows the variation of discharge capacity with the number of cycles (charge/discharge cycling is carried out at constant current density 15 mA/g) of the as-prepared two-component hybrid nanocomposites $PAn_{0.1}V_2O_5$, $PPy_{0.1}PEO_{0.25}V_2O_5$, $PTh_{0.1}V_2O_5$ and the cathode material disclosed in U.S. Pat. No. 6,582,850.
Figure 6:
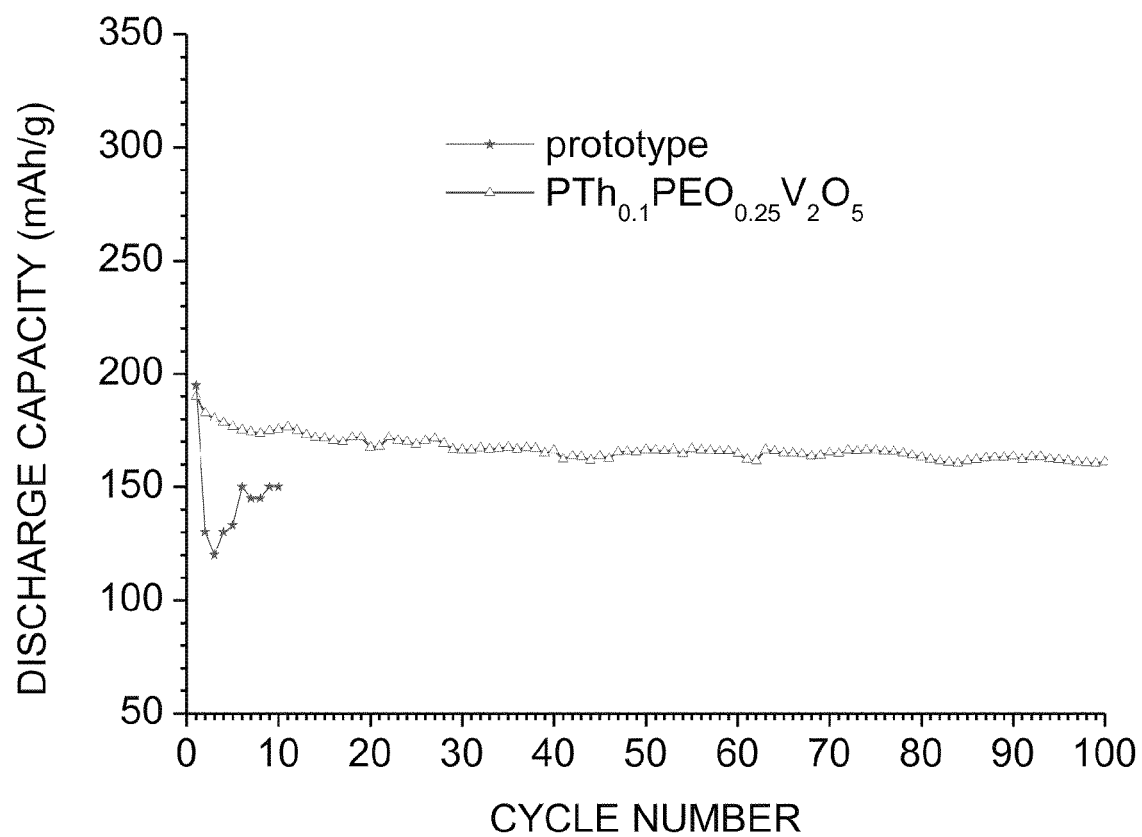
FIG. 6 shows the variation of discharge capacity with the number of cycles (charge/discharge cycling is carried out at constant current density 15 mA/g) of the as-prepared three-component hybrid nanocomposite $PTh_{0.1}PEO_{0.25}V_2O_5$ and the cathode material disclosed in U.S. Pat. No. 6,582,850.

Variation of discharge capacity with respect to the number of cycles for the as-prepared materials is depicted in FIG. 5. The discharge capacity of the as-prepared two-component nanocomposites exceeds that of the cathode material of U.S. Pat. No. 6,582,850. The same trend is observed in FIG. 6 for the as-prepared three-component hybrid organic-inorganic nanocomposites.

The two-component nanocomposites based on PPy and $V_2O_5$ possess the greatest capacity. The three-component nanocomposites have somewhat lower capacity, nevertheless they are more stable at prolonged cycling. The presence of the macromolecules of PEO, which have ion conducting properties, inside nanoparticles of the inorganic component promotes the process of electrochemical intercalation of lithium ions and improves the stability at charge-discharge cycling.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for preparing a hybrid two-component nanocomposite comprising a conducting conjugated polymer and vanadium oxide, the method comprising:
   a) combining a $V_2O_5$ xerogel and monomers of one or more of conducting conjugated polymers to form a reaction mixture; and
   b) mechanochemical treatment of the reaction mixture in a ball mill to form the hybrid nanocomposite wherein the $V_2O_5$ xerogel is from about 83 to 97 weight percent of the total weight of the reaction mixture.

2. The method of claim 1 wherein the monomers include a component selected from the group consisting of aniline, pyrrole, thiophene, and derivatives thereof, and combinations thereof.

3. The method of claim 1 wherein the reaction mixture subjected to step b) is substantially solvent free.

4. The method of claim 1 wherein the monomers of one or more conducting conjugated polymers is from about 3 to 17 weight percent of the total weight of the reaction mixture.

5. The method of claim 1 wherein the $V_2O_5$ xerogel is prepared by evaporating a vanadium oxide sol.

6. The method of claim 1 wherein the conducting conjugated polymer comprises a component selected from the group consisting of polyaniline ("PAn"), polypyrrole ("PPy"), polythiophene ("PTh"), and derivatives thereof, and combinations thereof.

7. The method of claim 5 wherein the vanadium oxide sol is prepared by dissolving crystalline $V_2O_5$ in an aqueous hydrogen peroxide solution followed by evaporation of the solution and drying of the $V_2O_5$ xerogel until a distance between $V_2O_5$ layers is from about 1.14 to about 1.19 nm.

8. A method for preparing a hybrid three-component nanocomposite comprising a conducting conjugated polymer, an ion conducting polymer, and vanadium oxide, the method comprising:
   a) combining a $V_2O_5$ xerogel and an ion conductive polymer to form a first reaction mixture;
   b) mechanochemical treatment of the first reaction mixture in a ball mill to form a first hybrid nanocomposite;
   c) combining the first hybrid nanocomposite and a monomer of one or more of conductive polymers to form a second reaction mixture; and
   d) mechanochemical treatment of the second reaction mixture in a ball mill to form the hybrid three-component nanocomposite.

9. The method of claim 8 wherein steps b) and d) are each substantially solvent free.

10. The method of claim 8 wherein the $V_2O_5$ xerogel is from about 94 to 98 weight percent of the total weight of the first reaction mixture.

11. The method of claim 8 wherein the ion conductive polymer is from about 2 to 6 weight percent of the total weight of the first reaction mixture.

12. The method of claim 8 wherein the monomers of one or more conducting conjugated polymers is from about 3 to 14 weight percent of the total weight of the second reaction mixture.

13. The method of claim 8 wherein the first hybrid nanocomposite is from about 86 to 97 weight percent of the total weight of the second reaction mixture.

14. The method of claim 8 wherein the $V_2O_5$ xerogel is prepared by evaporating a vanadium oxide sol.

15. The method of claim 8 wherein the conducting conjugated polymer comprises a component selected from the group consisting of polyaniline ("PAn"), polypyrrole ("PPy"), polythiophene ("PTh"), and derivatives thereof, and combinations thereof.

16. The method of claim 14 wherein the vanadium oxide sol is prepared by dissolving crystalline $V_2O_5$ in an aqueous hydrogen peroxide solution followed by evaporation of the solution and drying of the $V_2O_5$ xerogel until the distance between $V_2O_5$ layers is from about 1.14 to about 1.19 nm.

17. A hybrid nanocomposite comprising:
   a conducting polymer selected from the group consisting of conducting conjugated polymers, ion conducting polymer, and combinations thereof and vanadium oxide wherein the nanocomposite is a two-component hybrid and conducting conjugated polymers are present in an amount from about 3 to 17 percent of the total weight of the hybrid nanocomposite.

18. The nanocomposite of claim 17 wherein the nanocomposite is a two-component hybrid and the vanadium oxide is present in an amount from about 83 to 97 percent of the total weight of the hybrid nanocomposite.

19. The nanocomposite of claim 17 wherein the nanocomposite is a three-component hybrid and the ion conducting polymer is present in an amount from about 2 to 6 percent of the total weight of the hybrid nanocomposite.

20. The nanocomposite of claim 17 wherein the nanocomposite is a three-component hybrid and vanadium oxide is present in an amount from about 80 to 95 percent of the total weight of the hybrid nanocomposite.

21. The nanocomposite of claim 17 wherein the nanocomposite is a three-component hybrid and the conducting conjugated polymer is present in an amount from about 3 to 14 percent of the total weight of the hybrid nanocomposite.

* * * * *